Jan. 18, 1949.   F. A. VAN VLECK   2,459,204
BOX DUMPING MACHINE

Filed June 17, 1946   9 Sheets-Sheet 1

INVENTOR
F. A. Van Vleck
BY
ATTORNEYS

Jan. 18, 1949.  F. A. VAN VLECK  2,459,204
BOX DUMPING MACHINE
Filed June 17, 1946  9 Sheets-Sheet 2
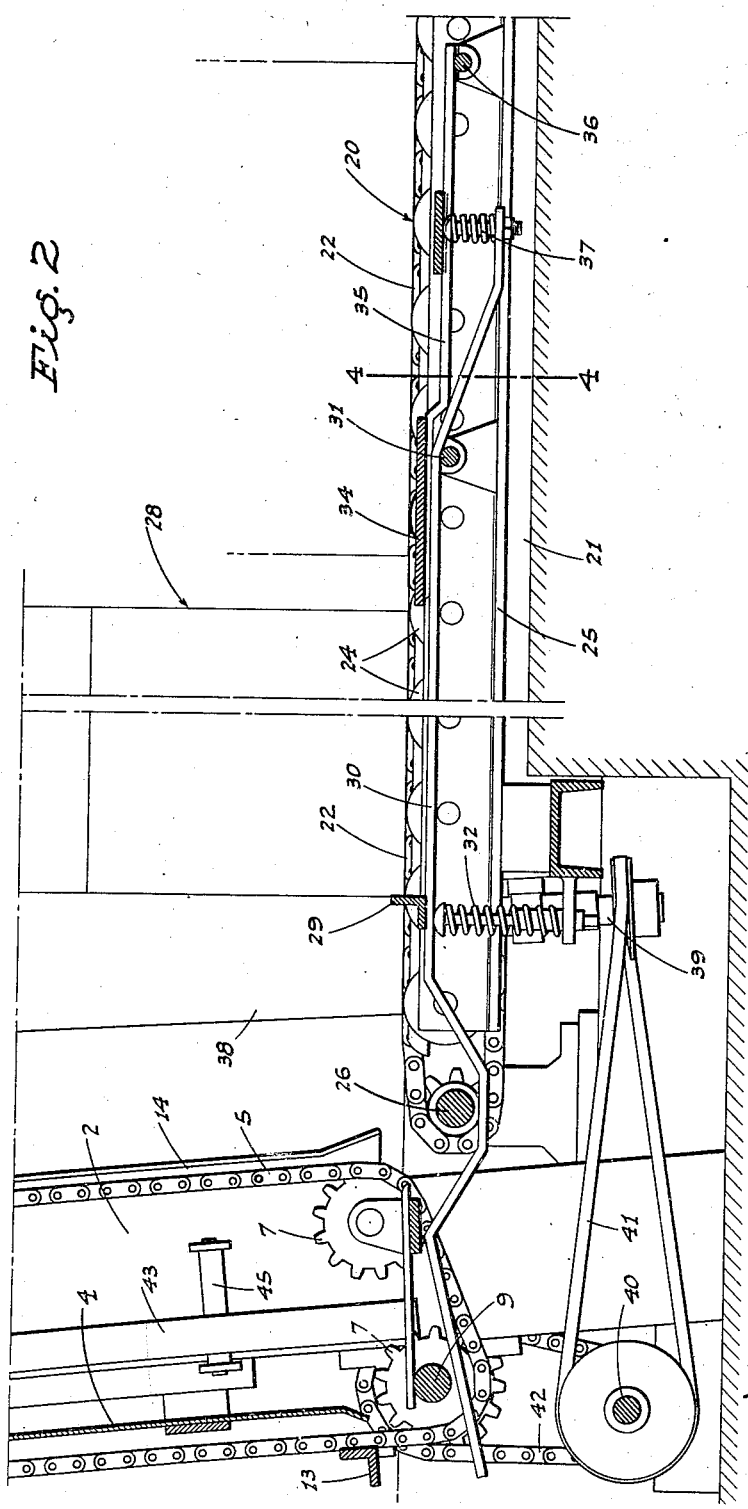
INVENTOR.
F. A. Van Vleck
ATTYS Jan. 18, 1949.  F. A. VAN VLECK  2,459,204
BOX DUMPING MACHINE
Filed June 17, 1946  9 Sheets-Sheet 3
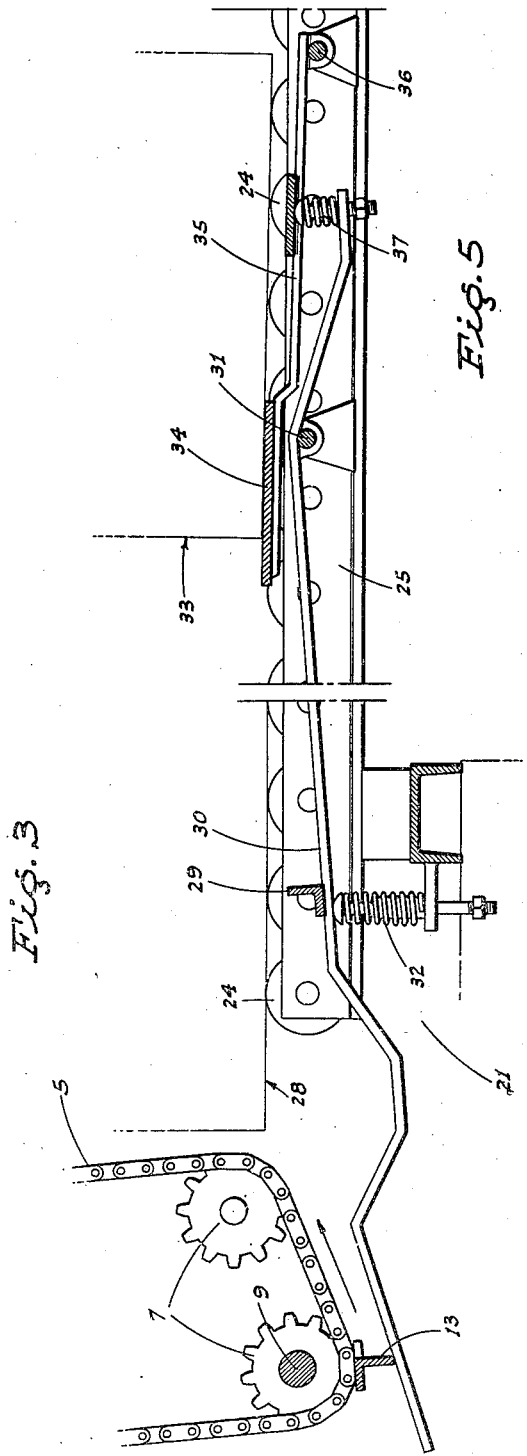
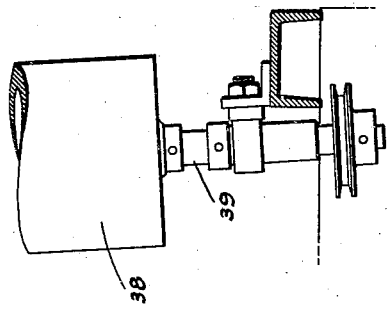
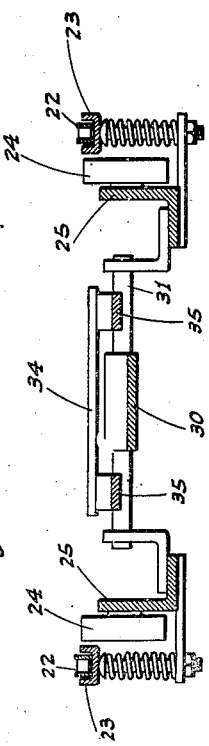
INVENTOR.
F. A. Van Vleck
BY
Lorentz & Lorentz
ATTYS

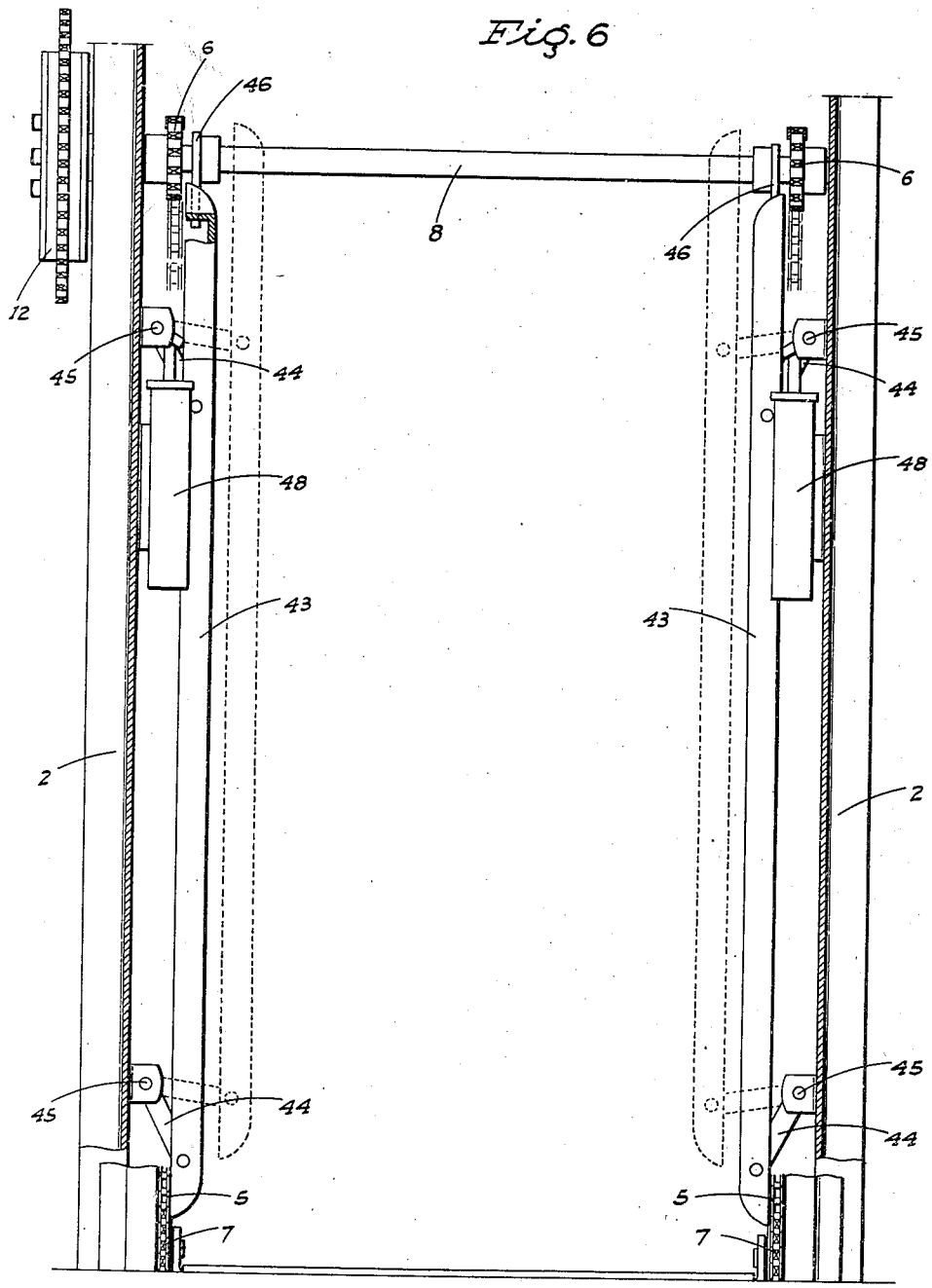

Jan. 18, 1949.                F. A. VAN VLECK                2,459,204
                              BOX DUMPING MACHINE
Filed June 17, 1946                                       9 Sheets-Sheet 5
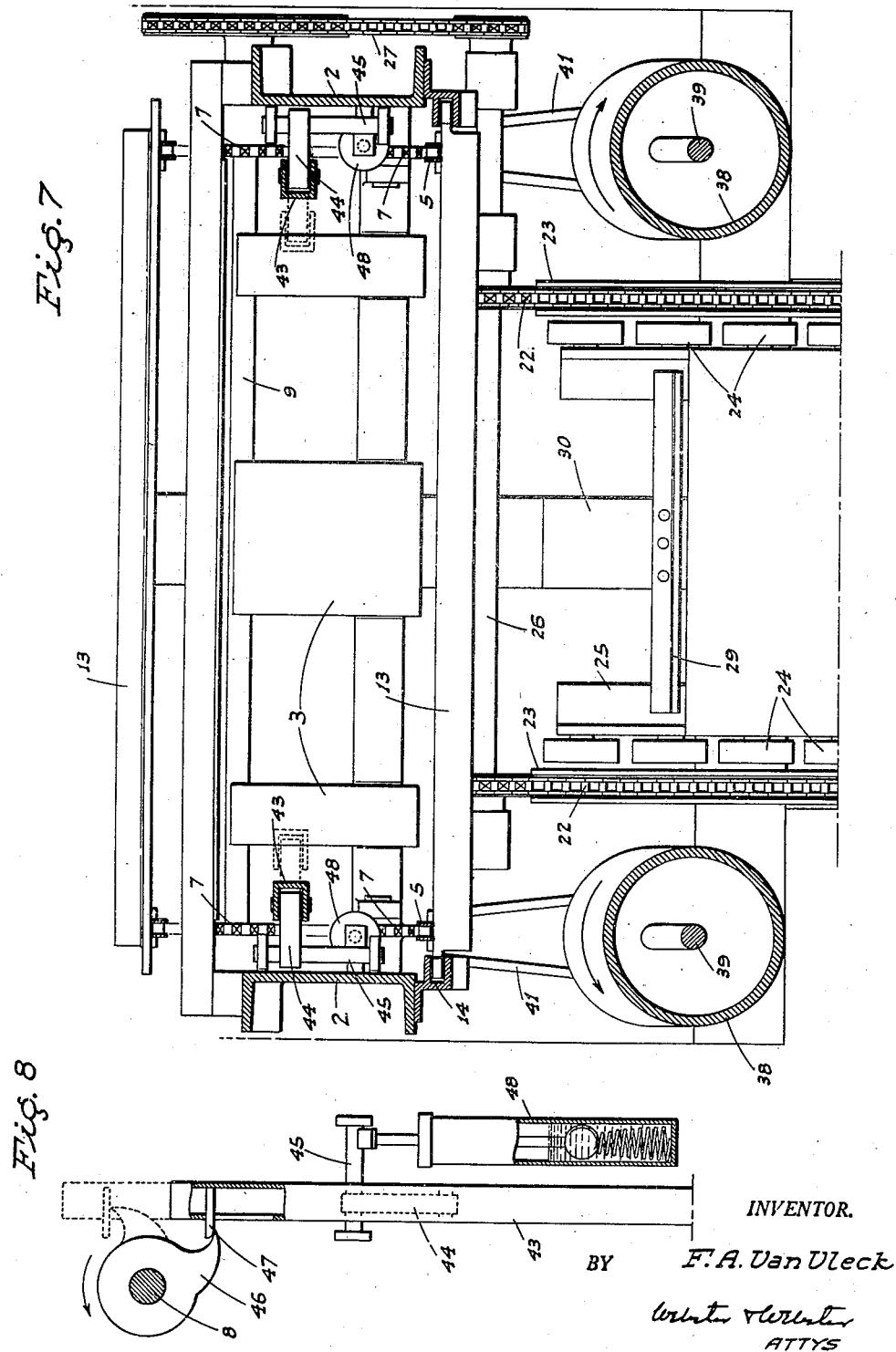
INVENTOR.
BY  F. A. VanVleck
    Webster Herester
    ATTYS

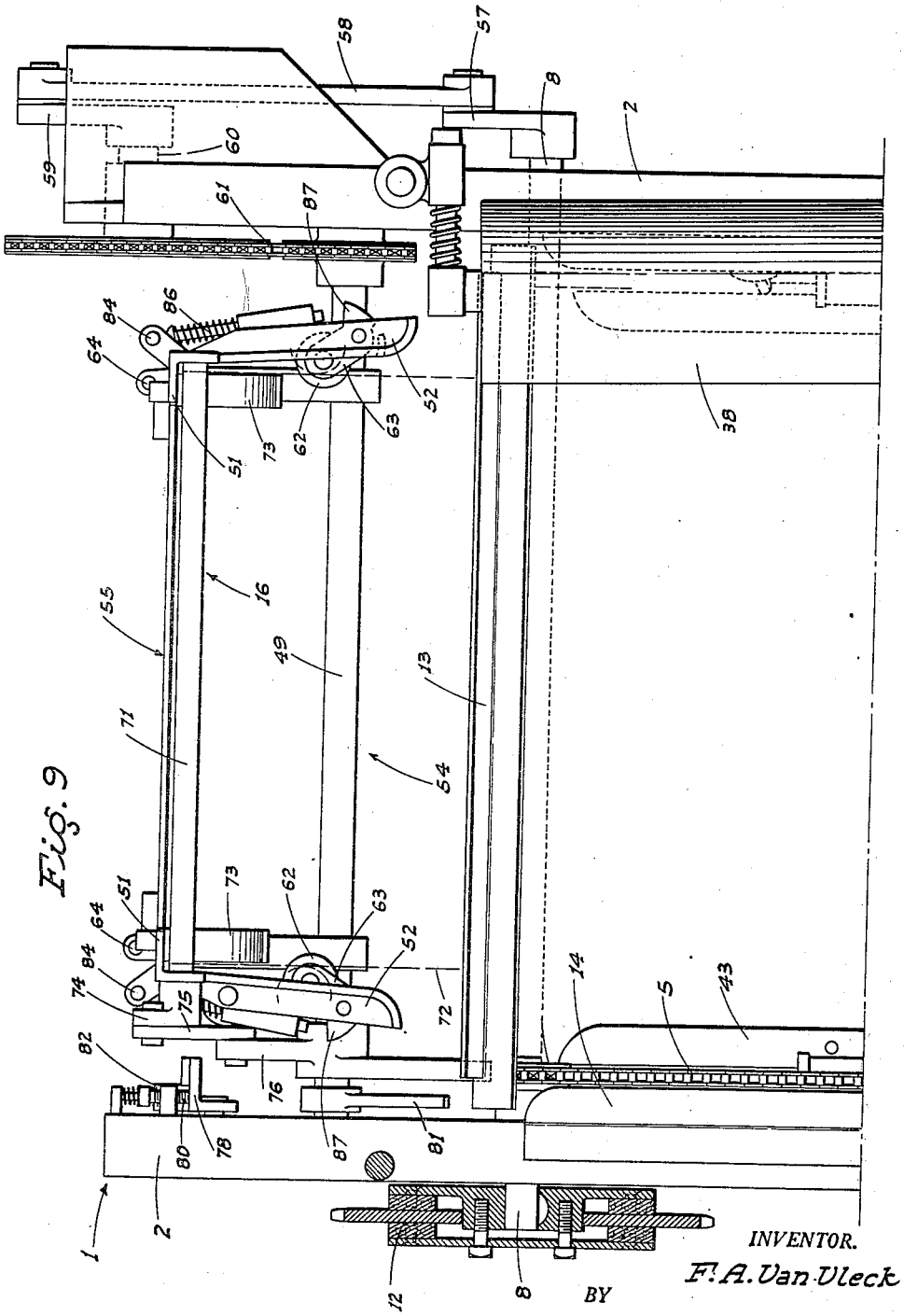

Jan. 18, 1949.   F. A. VAN VLECK   2,459,204
BOX DUMPING MACHINE

Filed June 17, 1946   9 Sheets-Sheet 7

INVENTOR.
F. A. Van Vleck
BY
Webster & Webster
ATTYS

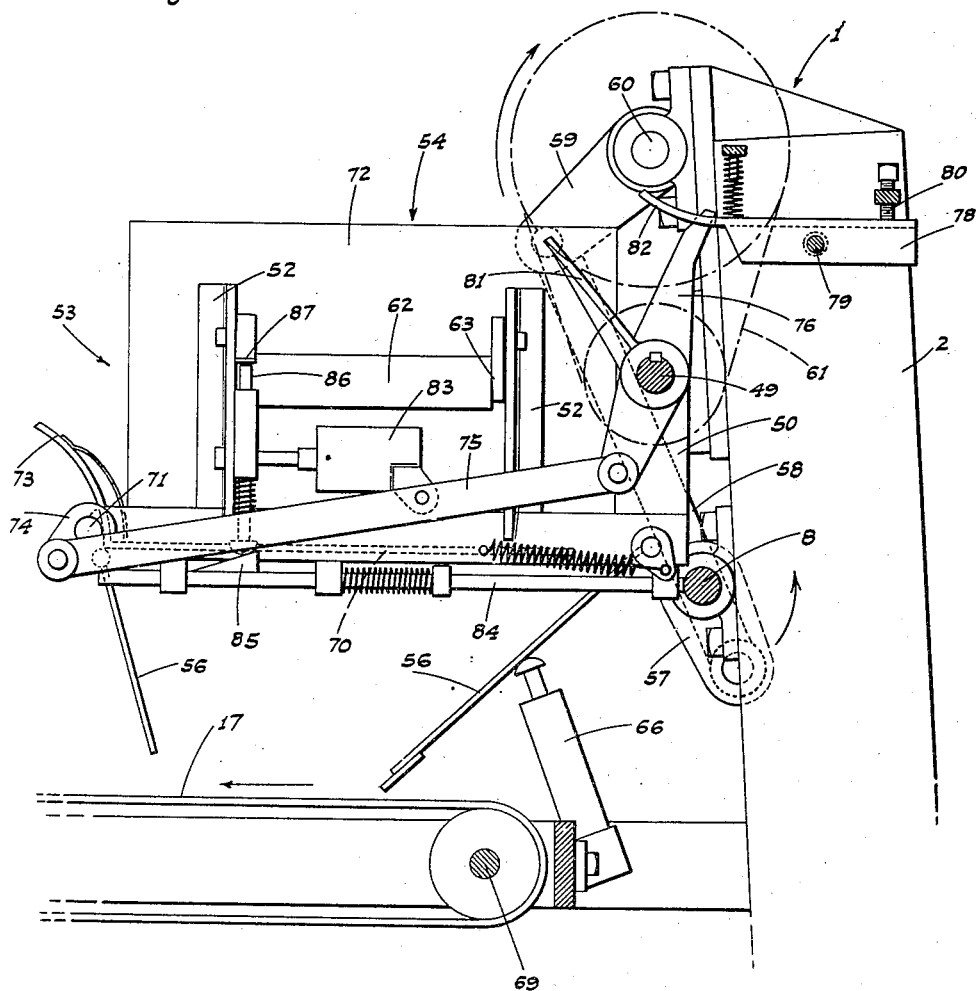
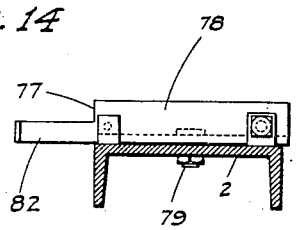

Jan. 18, 1949. F. A. VAN VLECK 2,459,204
BOX DUMPING MACHINE

Filed June 17, 1946 9 Sheets—Sheet 9

INVENTOR.
F. A. Van Vleck
BY
Webster & Webster
ATTYS

Patented Jan. 18, 1949

2,459,204

UNITED STATES PATENT OFFICE 2,459,204

BOX DUMPING MACHINE

Forest A. Van Vleck, Placerville, Calif., assignor to Food Machinery and Chemical Corporation, a corporation of Delaware Application June 17, 1946, Serial No. 677,307

16 Claims. (Cl. 214—1.1)

This invention relates to, and it is an object to provide, a power driven machine operative to engage stacked boxes and to automatically dump the contents of each box onto a conveyor and to deliver the empty box to another point for disposition.

This machine is especially designed for use in the fruit and vegetable packing industry wherein produce from the field is delivered to the packing house in field lugs stacked one upon the other. The invention thus provides a power machine to dump the produce from the boxes onto a carry-off conveyor, and avoids the necessity of considerable hand labor, as is now expended to dump the boxes.

Another object of the invention is to provide a box dumping machine which includes an elevator assembly for a stack of loaded boxes, and a timed, rocking head unit operative upon each cycle of movement to engage each box as it reaches the top of the elevator, and to swing such box from a normal upwardly opening position to an inverted position over the carry-off conveyor whereby the contents are effectively discharged onto said conveyor; the head unit including means to discharge the empty box onto a separate box conveyor before completing each cycle and returning to engage the next box of the stack.

A further object of the invention is to embody a gate in the rocking head unit, which functions to cover the initially open top of each box during the inverting operation and then automatically opens to dump the contents onto the carry-off conveyor.

An additional object is to provide a novel mechanism to convey individual stacks of boxes to the elevator in predetermined timed relation to movement of the latter; other stacks of boxes being automatically held back on the conveying mechanism until the proper time for advance to the elevator.

It is also an object to provide a device in the machine arranged to vertically aline the boxes of each stack on the elevator so that such boxes are in position to correct engagement by the rocking head unit.

A further object of the invention is to provide a practical box dumping machine, and one which will be exceedingly effective for the purpose for which it is designed.

These objects are accomplished by means of such structure and relative arrangement of parts as will fully appear by a perusal of the following specification and claims.

In the drawings:

Fig. 2 is a fragmentary side elevation showing the normal position of the stop and retarding plate of the floor level conveying mechanism.

Fig. 3 is a similar view, but with the stop lowered and the retarding plate raised.

Fig. 4 is a cross section on line 4—4 of Fig. 2.

Fig. 5 is a fragmentary view showing the mounting and drive of the lower end of the feed rollers.

Fig. 6 is a fragmentary front transverse section on line 6—6 of Fig. 1, showing the box alining bars.

Fig. 7 is an enlarged cross section on line 7—7 of Fig. 1.

Fig. 8 is a fragmentary sectional elevation showing one of the actuating cams for the box alining bars.

Fig. 9 is a fragmentary front elevation, partly in section, of the upper end of the box stack elevator, showing the rocking head unit in initial box engaging position.

Fig. 13 is a view similar to Fig. 10, but shows the rocking head unit in box dumping position.

Fig. 14 is a sectional plan of the latch employed to cause actuation of the box discharging means of the rocking head unit.

Figure 1:
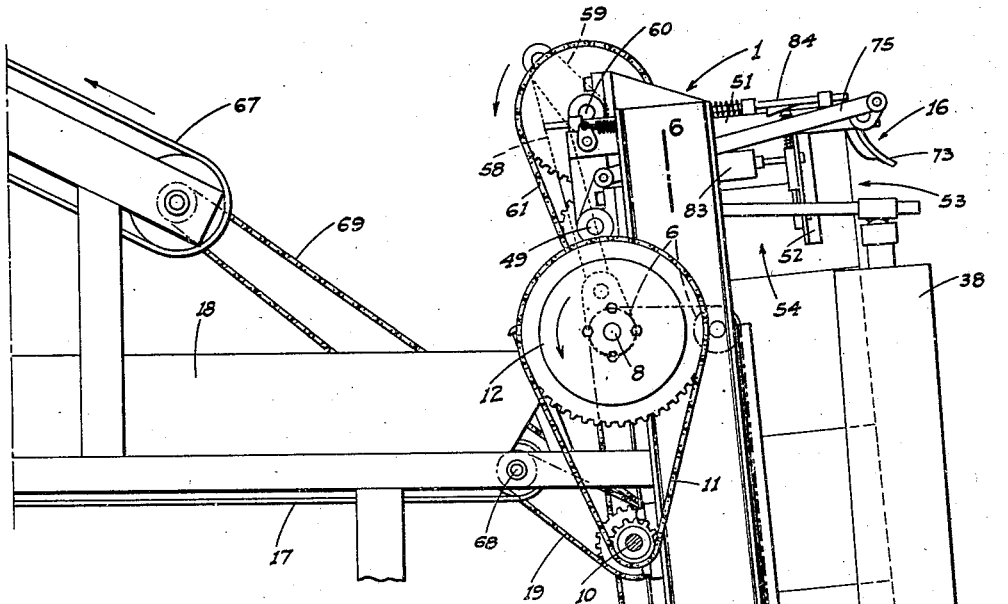
Fig. 1 is a side elevation of the box dumping machine.
Figure 12:
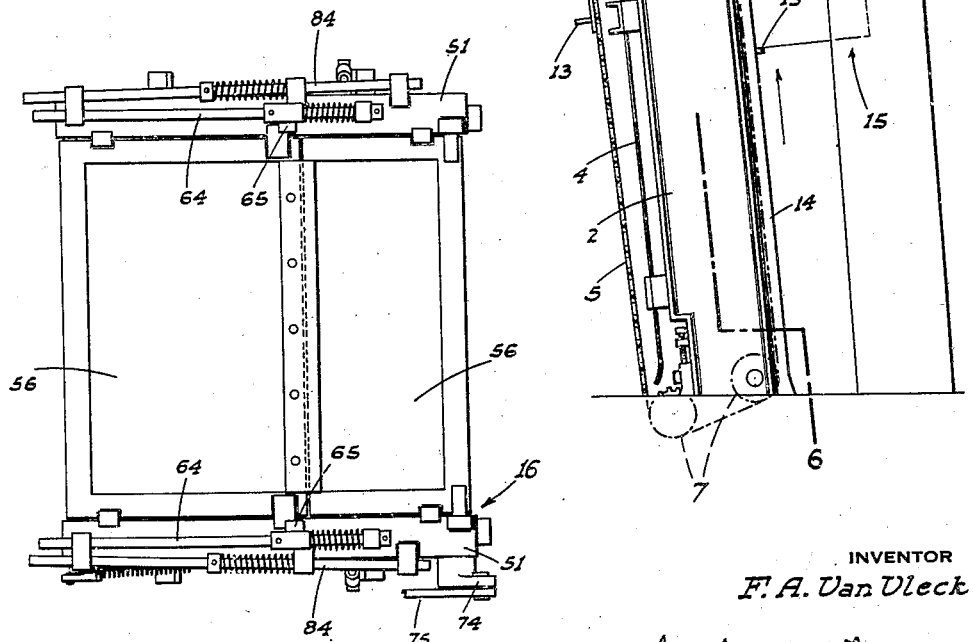
Fig. 12 is a bottom plan view of the rocking head unit.
Figure 10:
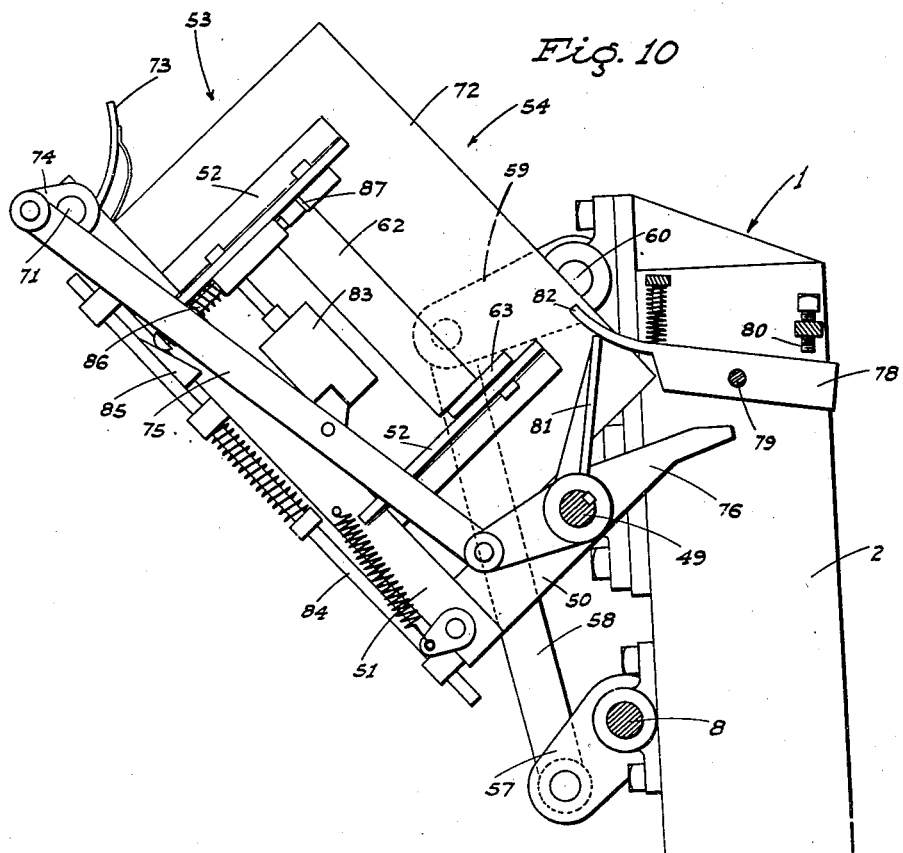
Fig. 10 is a side elevation of the rocking head unit as swinging down to dump a box.

Referring now more particularly to the characters of reference on the drawings, the box dumping machine comprises an upstanding main frame, indicated generally at 1, and which main frame is disposed at a slight upward and rearward incline. The main frame 1 includes a pair of transversely spaced, upstanding side beams 2 connected together, in rigid relation, by suitable means which does not obstruct the space between said beams. At the bottom the main frame 1 includes a substantially floor level platform 3.

Above the platform 3 the main frame 1 is formed with a flat back wall 4 which has the same inclination as said frame.

The main frame 1 supports an endless, box stack elevator constructed as follows:

A transversely spaced pair of endless, elevator chains 5 are disposed so that the forward runs thereof extend upwardly in parallel relation a considerable distance ahead of the back wall 4, while the rearward runs of said chains are disposed back of said wall. The chains 5 are each supported, top and bottom, by horizontally spaced pairs of upper and lower sprockets, indicated at 6 and 7, respectively; the rearmost ones of the upper sprockets 6 being carried on a driven cross shaft 8, while the rearmost ones of the lower sprockets 7 are carried on another cross shaft 9.

A drive shaft 10 is journaled in connection with the main frame 1 at the back thereof, and is actuated from an electric motor (not shown); there being an endless chain and sprocket unit 11 connecting between the drive shaft 10 and the driven shaft 8. The uppermost sprocket of the unit 11 is of relatively large diameter and includes therein a friction clutch 12 set to release if any part of the machine jams.

The endless elevator chains 5 are connected by a pair of elevator bars 13 secured to said chains half the length thereof apart. The elevator bars 13 project outwardly from the chains 5 and when traveling upwardly with the forward runs of said chains, end portions of said elevator bars 13 slidably engage in guide channels 14 formed on the front of the side beams 2.

When the above described elevator is functioning, the elevator bars 13, as they begin to rise with the forward runs of the elevator chains 5, are adapted to engage, from below, with a stack of boxes 15 seated on the platform 3, and to then elevate such stack with the same bearing against the back wall 4. The elevator bars 13 engage each stack 15 from below at such point that the stack tends to tilt toward and engage the back wall 4. As each stack is elevated slowly by the described elevator within the upstanding main frame 1, a rocking head unit, indicated generally at 16 and mounted at the upper end of the main frame 1, functions in timed relation to engage each uppermost box as the stack rises and to then rock over and back so as to invert the engaged box and dump the contents thereof onto a substantially horizontal produce conveyor 17 which runs in the bottom of a trough 18 leading away from the back of the main frame 1. The construction and operation of the rocking head unit 16 will hereinafter be described in greater detail. The produce conveyor 17 is driven from the drive shaft 10 by means of an endless chain and sprocket unit 19.

The stacks of boxes 15 are delivered onto the platform 3, one at a time, and in proper timed relation to operation of the remainder of the machine, by the following arrangement.

A substantially floor level conveyor, indicated generally at 20, extends along the floor in a suitable trough 21 in a direction toward and terminating closely adjacent the platform 3 in the upstanding main frame 1. The floor level conveyor 20 comprises transversely spaced, endless chains 22 whose upper runs are carried in upwardly spring-urged channels 23, and longitudinal rows of rollers 24 are disposed laterally inwardly of the upper runs of the endless chains 22, and are mounted on adjacent longitudinal beams 25 of the floor level conveyor.

Stacks of loaded boxes are delivered onto the floor level conveyor 20 adjacent the outer end thereof, and are moved along said conveyor by frictional engagement with the upper runs of the endless chains 22; said chains actually serving as the stack advancing means, while the stacks bear mainly on the rollers 24. The endless chains 22 are driven, with the upper runs thereof moving toward the main frame 1, by a forward cross shaft 26 driven from the cross shaft 9 of the elevator by means of an endless chain and sprocket unit 27.

As the lead stack of the stacks on the floor level conveyor 20 approaches the main frame 1, such lead stack, as shown at 28 in Fig. 2, runs against an upstanding transverse stop 29 fixed on a longitudinal lever 30 which extends centrally within the conveyor 20 from a point below the elevator in the main frame 1. Within the conveyor 20 the lever 30 is pivoted, intermediate its ends, as at 31; the transverse stop 29 being on said lever 30 between the pivot 31 and the lower end of the elevator; said lever being urged from below by a compression spring unit 32 which normally maintains the transverse stop 29 raised to stack engaging position.

The forward end portion of the lever 30 is formed and disposed so that when each elevator bar 13 traverses the bottom portion of the endless elevator chains 5 said bar strikes and lowers such forward end portion of the lever 30 in the manner shown in Fig. 3, causing lowering or retraction of the transverse stop 29. When this occurs the lead stack of boxes 28, under which stack the chains 22 have been slipping when the stack was engaged with the stop 29, is advanced into the main frame 1 and onto the platform 3 just in time to be engaged from below and raised by the same elevator bar which actuated said lever 30.

A retarding plate 34 is disposed between the rows of rollers 24 some distance to the rear of the transverse stop 29, and said plate is carried on swing arms 35 pivoted, as at 36, for upward swinging movement from a normally lowered position with the plate 34 in clearance relation to box stacks on the conveyor 20. However, when the lever 30 is swung downward at its forward portion to clear or release the transverse stop 29 from the lead stack of boxes 28, the rear end portion of said lever, functioning through the medium of a compression spring unit 37, raises the swing arms 35 and consequently the stack retarding plate 34. When this occurs, the stack of boxes 33 is engaged from beneath and lifted sufficiently that the endless chains 22 slip beneath said stack without advancing the same. In this manner the lead stack 28 is not followed by the stack 33 when the stop 29 is released to permit said stack 28 to pass onto the platform 3.

The above described arrangement provides a relatively simple and yet effective means of delivery, one at a time, of stacks of boxes onto the platform 3 in proper timed relation to operation of the described stack elevator.

When the lever 30 returns to a normal position after passage of each elevator bar 13, and the stop 29 again assumes a stack stopping position, the retarding plate drops and the stack 33 becomes the lead stack 28 and moves forwardly until the stop 29 is engaged thereby.

To assure that each lead stack 28 is positively advanced into the main frame 1 and onto the platform 3, as such stack reaches the discharge end of the floor level conveyor 20, there is provided a pair of upstanding, transversely spaced feed rollers 38 directly ahead of the side beams 2 of the main frame 1; said feed rolls being inclined to parallel the side beams 2, and each roll includes a spindle 39, suitably journaled top and bottom in feed roll supporting relation. The feed rolls 38 turn in the directions shown by the arrows in Fig. 7, and each spindle 39 is driven from its lower end, and from a cross shaft 40 below the main frame 1, by means of an endless belt and pulley unit 41. The cross shaft 40 is driven from the elevator cross shaft 9 by means of an endless chain and sprocket unit 42.

When in operation the feed rolls 38 bear against the opposite sides of the lead stack of boxes 28 and positively deliver the same from the conveyor 20 onto the platform 3, whence each stack is elevated by one of the elevator bars 13, as previously described. The feed rolls are spring urged in a laterally inward direction so as to assure proper stack contact.

During the operation of elevating each stack, the boxes of the same are automatically brought into alinement, tranversely of the machine, by means of the following mechanism:

A pair of upstanding, box alining bars 43 are disposed in the main frame 1 in transversely spaced relation adjacent but inwardly of the side beams 2. The alining bars 43 are outwardly facing channels, and the same are supported, at vertically spaced points, by parallel links 44 which pivotally connect between said bars 43 and rotatable attachment rods 45 on said side beams 2. The parallel links 44 on the box alining bars 43 are normally disposed at a downwardly and laterally inward incline, whereby said bars are then spaced apart a greater distance than the width of a stack of boxes laterally of the machine.

However, when a stack of boxes is being carried upwardly by the elevator on one of the elevator bars 13, the alining bars 43 are simultaneously swung inwardly into engagement with opposite sides of said stack of boxes, whereby to aline said boxes transversely of the machine. This inward swinging of the alining bars 43 is accomplished through the medium of hook-like cams 46 positioned on the driven cross shaft 8 and operative, in correct timed relation, to engage below corresponding ears 47 on the upper ends of said bars, whereby with continued rotation of the shaft 8, the cams 46 raise the bars 43, which results—by virtue of the parallel linkage—in inward motion of the alined bars 43, as they rise. After the alining bars 43 have been raised by the cams 46 inwardly into stack alining positions, the cams 46, continuing to rotate, escape the ears 47, whereupon the alined bars 43 drop by gravity and simultaneously move outward to their starting position. Hydraulic shock absorbers 48 are provided to damp downward motion of the alining bars 43 as they return to said starting position, and which occurs before the rocking head unit 16 begins to engage and dump boxes from the alined stack which is traveling upwardly on the conveyor.

The rocking head unit 16 is constructed, and functions in timed relation to operation of the remainder of the machine, in the following manner:

A cross shaft 49 is journaled on the back of the main frame 1 some distance above, and in parallel relationship to, the driven cross shaft 8. A pair of relatively short radial arms 50 are fixed on and project from the cross shaft 49 for swinging motion from an upstanding position, as in Fig. 1, to a depending position, as in Fig. 13, with oscillation of such shaft through approximately 180° in the manner hereinafter described.

A pair of transversely spaced side bars 51 are fixed in connection with, and project outwardly from, the outer ends of the arms 50 at right angles to the latter; said side bars having side posts 52 fixed thereon in spaced relation outwardly of the arms 50. The radial arms 50, side bars 51, and spaced side posts 52 form, in effect, a swinging frame of skeleton construction; said frame being open at its outer end, as indicated generally at 53, open at the front, as indicated generally at 54, and normally closed at the back by a gate or lid, indicated generally at 55. The gate or lid 55 comprises a pair of gate plates or doors 56 hinged, at opposite ends, in connection with the side bars for outward opening movement, though normally latched in the manner hereinafter described.

The rocking head unit 16, including the swinging frame, as comprised of arms 50, side bars 51, and side posts 52, is rocked by shaft 49 through an oscillating path or cycle starting with said rocking head unit projecting forwardly from the main frame, as in Fig. 1, to an inverted position projecting rearwardly from the main frame, as in Fig. 13.

The path of movement is approximately 180° in each direction, and such movement of the rocking head unit is accomplished from the driven cross shaft 8, in the following manner, and in such timed relation to elevation of a stack of boxes 15 on the elevator, that each time the rocking head unit swings to its starting position it engages over the topmost box of the stack 15 being carried upwardly by the elevator. The shaft 8 is fitted with a crank 57, which in turn is coupled by a pivotally mounted link 58, with a radial oscillating arm 59 fixed on another cross shaft 60 on the back of the main frame 1 above cross shaft 49. With each rotation of the cross shaft 8 and crank 57 the arm 59 is oscillated through a predetermined path, resulting in corresponding oscillation of the cross shaft 60.

A motion increasing, endless chain and sprocket unit 61 is connected between adjacent ends of the cross shaft 60 and cross shaft 49, whereby when the cross shaft 60 oscillates, the cross shaft 49 is oscillated, but through a greater arc, i. e. approximately 180°. In this manner the rocking head unit 16 is recurringly swung between its limits of movement, as previously described, and at relatively slow speed, which bears predetermined timed relation to the speed of the elevator chains 5.

As the rocking head unit reaches its starting position it engages over the top box of the slowly, upwardly moving stack 15 on the elevator, and said box is effectively clamped in said rocking head unit by a pair of swingably mounted, box gripping rollers 62 which extend between the side posts 52 and are carried on pivotally mounted roller supported arms 63. In the starting position of the rocking head unit the arms 63 extend upwardly and inwardly, whereby the rollers 62, which are relatively heavy, tend to fall into binding or wedging engagement with opposite ends of the surrounded box, whereby to effectively trap said box in the rocking head unit for subsequent motion therewith.

After so engaging with the uppermost box of the stack 15 on the elevator, and with continued relatively slow motion of the machine, the rocking head unit is swung upwardly and rearwardly until it is inverted and projects rearwardly, as in Fig. 13. From the starting position of the rocking head unit to its inverted position, the gate 55 serves effectively as a closure for the adjacent open top of the engaged box, whereby to prevent spillage of the contents therefrom.

The gate plates 56 are normally maintained in closed position by means of spring-urged, longitudinally extending side rods 64 slidably mounted on the side bars 51, and carrying a latch 65 which cooperates with a corresponding part of one of the gate plates 56, and which one gate plate normally maintains the other closed. When the rocking head unit reaches its fully inverted position, as in Fig. 13, the side rods 64 strike at one end against the cross shaft 8, advancing said rods to an extent that the latches 65 are released and the gate plates 56 fall open, whereupon the contents of the engaged box discharge onto the conveyor 17, which is immediately therebelow. The downward dropping movement of one or both of the gate plates 56 may be checked by a shock absorber, such as is shown at 66.

Upon opening of the gate plates 56 and discharge of the contents of the box onto the conveyor 17, the rocking head unit begins the return portion of the cycle, and after it has raised slightly on such return, the empty box is automatically discharged from said rocking head unit onto an adjacent endless conveyor 67 above the conveyor 17 by means of the mechanism, and in the manner, hereinafter described. The conveyor 67 is driven in the direction, indicated by the arrow in Fig. 1, from one end shaft 68 of the conveyor 17 by means of an endless chain and sprocket unit 69.

Figure 11:
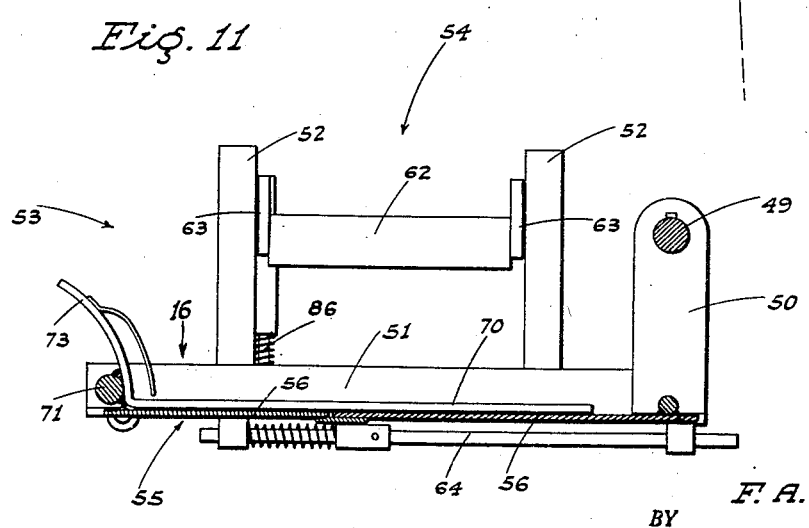
Fig. 11 is a longitudinal section of the rocking head unit, detached.
Figure 15:
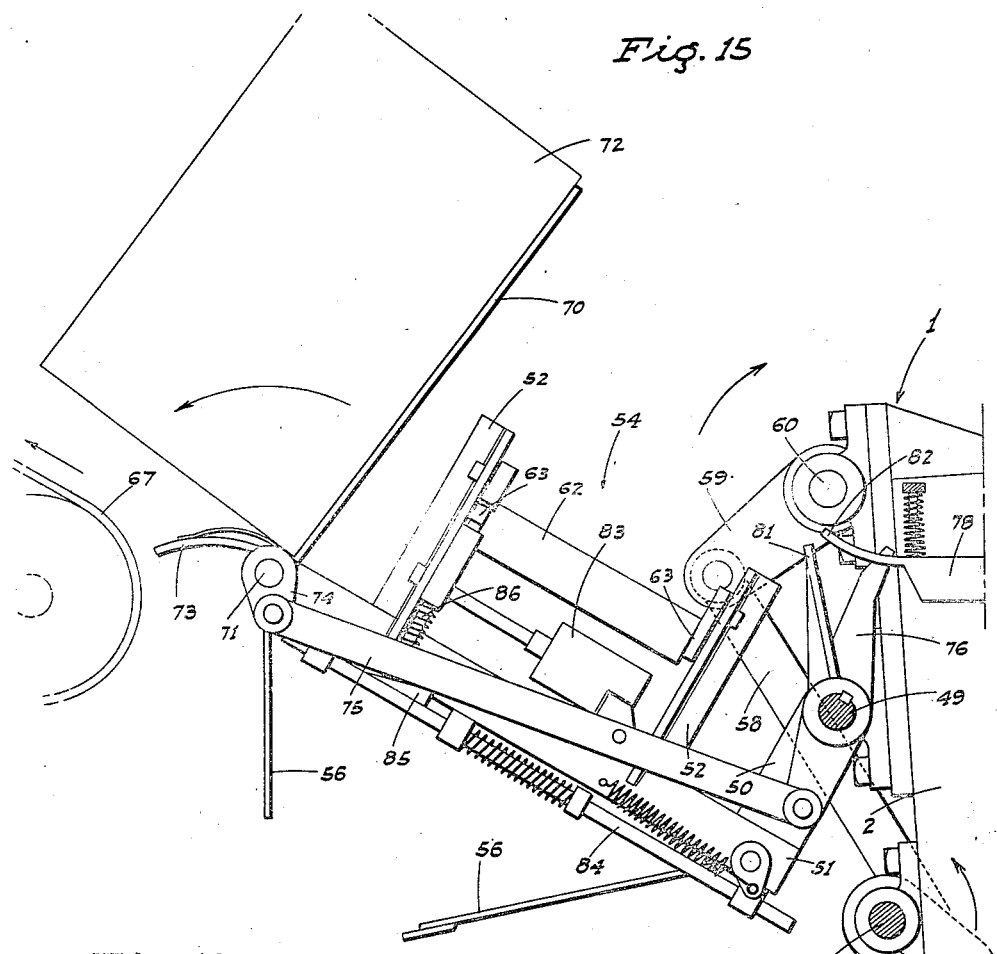
Fig. 15 is a view similar to Fig. 10, but shows the rocking head unit as moving back toward its starting point and in box discharging position.
Figure 16:
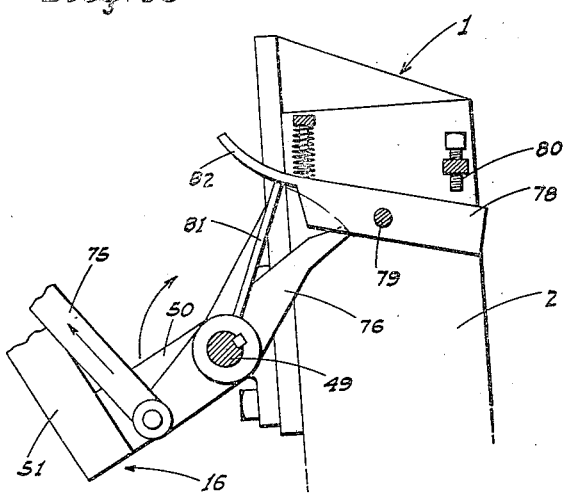
Fig. 16 is a fragmentary sectional elevation showing releasing of the latch to allow the box discharging means to return to normal.

The rocking head unit includes a pair of box discharging fingers 70 which normally lie along the side bars 51; said box discharging fingers being attached, at their outer ends, on a cross shaft 71 for simultaneous upward and outward swinging motion from the under-box position shown in Fig. 11 when the rocking head unit is fully inverted, to the box discharging position, as shown in Fig. 15, when said rocking head unit is on the return portion of its cycle. The box discharging fingers 70 are so swung by means hereinafter described, and when this occurs the then empty box, as indicated at 72, is delivered from the rocking head unit onto the box conveyor 67. At their outer or pivotally mounted ends the box discharging fingers 70 include spring carrying lips 73 over which the empty box falls when discharging; said lips serving, however, to maintain the box in the rocking head unit in proper position until the time for discharge of said box onto the conveyor 67.

The means for effecting the above described box discharging action of the fingers 70 comprises a crank 74 on one end of the shaft 71, and a link 75 which pivotally connects between said crank and a double-ended lever 76 turnably mounted on the cross shaft 49 in alinement with the crank 74. When the rocking head unit has reached its inverted, box dumping position, the free end of the double-ended lever 76 is projecting upwardly and has snapped by, and engaged against, a shoulder 77 of a spring-urged latch 78 pivotally mounted, as at 79, on the adjacent one of the side beams 2; the arrangement being such that the latch, which includes a stop 80, prevents clockwise rotation of said double-ended lever 76, under the influence of the link 75, when the rocking head unit begins the return portion of its cycle of movement. As a result the shaft 71 is relatively rotated as the rocking head unit rises, producing a relative motion of the box discharging fingers 70 from their normal position lying flat along the side bars 51, as in Fig. 11, to an upstanding, box discharging position, as in Fig. 15. After the box 15 has been discharged, as previously described, and with continued further return movement of the rocking head unit, a rigid trip 81, fixed with the double-ended lever 76, strikes a curved release tongue 82 on the latch 78, raising the latter sufficient to release the lever 76. Thereupon, with further return movement of the rocking head unit, the discharge fingers 70 fall back to their normal position, as do the gate plates 56, which automatically relatch. The motion of the box discharging fingers 70 falling back to normal position may be checked, if desired, by shock absorbers 83 connected between the links 75 and one of the posts 52.

To assure that the box engaging rollers 62 fall free of the ends of the engaged box when the rocking head unit reaches its inverted, box dumping position, and before the box is discharged, there is provided a pair of spring-urged side rods 84 slidably mounted alongside the side rods 64, and similarly abutting against the shaft 8 when the rocking head unit is so inverted. When the side rods 84 abut the shaft 8 they move lengthwise, and said rods carry cams 85 which actuate spring-returned plungers 86 on adjacent ones of the posts 52; said plungers 86, when so actuated, striking a projection 87 on the arms 63, swinging said arms in a direction to relieve the rollers 62 from the box.

As the rocking head unit completes each cycle of movement between its starting point to its inverted position and return, the elevator carries the stack 15 upwardly a distance equal to the height of one of the boxes. Thus, each time the rocking head unit returns to its initial or starting point it engages and picks up the uppermost box of the stack 15 for dumping.

All of the operations of the machine are nicely timed so that the machine functions effectively and continuously to engage and dump the individual boxes of each stack as the stacks are delivered by the floor level conveyor 20 to the described elevator. The machine thus provides an effective and practical arrangement for the automatic dumping of open-topped boxes filled with produce and arranged in stacks; the dumping operation being accomplished without damage to the produce, and without the necessity of manual handling of the boxes.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as described by the appended claims.

Having thus described the invention, the following is claimed as new and useful, and upon which Letters Patent are desired:

1. A box dumping machine comprising an upstanding frame, an elevator on the frame adapted to engage and elevate a stack of loaded, open topped boxes, a box gripping, rocking head unit mounted on the frame for oscillating movement between a starting point in position to receive and grip the top box of each elevator supported stack at a predetermined elevation and a dumping point with said rocking head unit and box in inverted position, and power drive means arranged to operate the elevator and oscillate the rocking head unit in predetermined timed relation; there being a substantially floor-level box stack conveying mechanism disposed to deliver stacks to the elevator below said rocking head unit, said mechanism including transversely spaced conveyor chains which frictionally engage the stacks from below, a retractable stop normally disposed in the path of the lead stack whereby to prevent its advance and delivery to the elevator, the chains then slipping under the stacks, a vertically movable stack retarding member positioned in normally clearance relation below the next following stack, a lever mounted adjacent the conveying mechanism and operative when moved in one direction to retract the stop and to raise the retarding member into lifting relation to said next following stack whereby to permit the lead stack to advance and deliver to the elevator while retarding movement of said next following stack so that one stack at a time is delivered to said elevator, and means operative from the elevator to so move said lever in timed relation to elevator movement.

2. A box dumping machine comprising an upstanding frame adapted to engage and elevate a stack of loaded, open topped boxes, a pair of transversely spaced stack alining bars disposed for elevation of each stack therebetween, means mounting the bars in connection with the frame for motion between a position in normally clearance relation to each stack to box alining engagement therewith, means operative in timed relation to the elevator operative to move the bars into box alining engagement with each stack on the elevator, a box gripping, rocking head unit mounted on the frame for oscillating movement between a starting point in position to receive and grip the top box of each elevator supported stack at a predetermined elevation and a dumping point with said rocking head unit and box in inverted position, and power drive means arranged to operate the elevator and oscillate the rocking head unit in predetermined timed relation.

3. A box dumping machine comprising an upstanding frame adapted to engage and elevate a stack of loaded, open topped boxes, a pair of transversely spaced stack alining bars disposed for elevation of each stack therebetween, means mounting the bars in connection with the frame for motion between a position in normally clearance relation to each stack to box alining engagement therewith, means operative in timed relation to the elevator to move the bars into box alining engagement with each stack on the elevator, a box gripping, rocking head unit mounted on the frame for oscillating movement between a starting point in position to receive and grip the top box of each elevator supported stack at a predetermined elevation and a dumping point with said rocking head unit and box in inverted position, and power drive means arranged to operate the elevator and oscillate the rocking head unit in predetermined timed relation; said bar mounting means comprising a parallel linkage assembly for each bar, the links normally inclining downwardly and laterally inwardly, the elevator including a driven cross shaft, and said bar moving means including cams on said shaft disposed and operative to raise corresponding ones of the bars with each revolution of said shaft.

4. A box dumping machine comprising an upstanding frame, means to deliver loaded open topped boxes one at a time to a predetermined point adjacent the frame, a box gripping, rocking head unit mounted on the frame for oscillating movement through an upward arc between starting and dumping positions projecting in opposite directions from the frame, the rocking head unit being at said predetermined point in the starting position and inverted at the dumping position, means operative to oscillate the rocking head unit in such timed relation to the box delivery means that a box is disposed at said predetermined point and engaged by the rocking head unit each time the latter returns to its starting position, a normally latched gate on the rocking head unit, said gate closing the top of the engaged box between said starting and dumping positions of the rocking head unit, and means which unlatches the gate upon its arrival at said dumping position.

5. A box dumping machine comprising an upstanding frame, means to deliver loaded open topped boxes one at a time to a predetermined point adjacent the frame, a box gripping, rocking head unit mounted on the frame for oscillating movement through an upward arc between starting and dumping positions projecting in opposite directions from the frame, the rocking head unit being at said predetermined point in the starting position and inverted at the dumping position, means operative to oscillate the rocking head unit in such timed relation to the box delivery means that a box is disposed at said predetermined point and engaged by the rocking head unit each time the latter returns to its starting position, a normally latched gate on the rocking head unit, said gate closing the top of the engaged box between said starting and dumping positions of the rocking head unit, and means which unlatches the gate upon its arrival at said dumping position, there being timed means provided on said rocking head unit and operative to discharge each box therefrom after such box is dumped and before another box is gripped by said unit.

6. A box dumping machine comprising an upstanding frame, means to deliver loaded open topped boxes one at a time to a predetermined point adjacent the frame, a box gripping, rocking head unit mounted on the frame for oscillating movement through an upward arc between starting and dumping positions projecting in opposite directions from the frame, the rocking head unit being at said predetermined point in the starting position and inverted at the dumping position, means operative to oscillate the rocking head unit in such timed relation to the box delivery means that a box is disposed at said predetermined point and engaged by the rocking head unit each time the latter returns to its starting position, such box then moving with the rocking head unit between said starting and inverted dumping positions thereof, and instrumentalities associated with the rocking head unit arranged to discharge the dumped box therefrom during return movement of said unit between dumping and starting positions; said instrumentalities including a transversely spaced pair of box discharging fingers pivoted on the rocking head unit for relative motion in a direction to discharge a box outwardly from said rocking head unit upon such return movement thereof, the fingers lying beneath the box when the latter is in inverted dumping position, and means arranged to cause such relative, box discharging motion of the fingers upon return movement of the rocking head unit.

7. A box dumping machine as in claim 6 in which the box discharging fingers are shaft mounted, a crank on one end of the shaft, a link pivotally connected at one end to the crank, a lever radially with the axis of the rocking head unit but mounted for relative rotation, the link being pivotally connected at the other end to said radial lever, latch means operative to lock said radial lever against rotation during a portion of the return movement of the rocking head unit whereby box discharging relative movement of said fingers occurs, and means to release said latch means after discharge of a box and before the rocking head unit reaches said starting position.

8. A box dumping machine comprising in driven, timed relation a substantial floor-level conveyor for loaded, open topped boxes, an elevator at one end of the conveyor, the latter delivering boxes to the elevator, a box gripping rocking head unit mounted on the frame for oscillating movement between a starting position and an inverted dumping position, said elevator lifting boxes delivered thereto from said conveyor to bring said boxes successively into close relation with said unit as the latter arrives at said starting position, the rocking head unit engaging and gripping the uppermost box on the elevator at said starting position and then oscillating to invert the box, a normally latched gate on the rocking head unit closing the top of the engaged box between said starting and dumping positions, and means which unlatches the gate and permits the box to dump upon the arrival of said unit at dumping position.

9. In a box dumping machine, the combination of: a frame; a rocking head unit mounted on the frame; means for oscillating said unit between a starting position and an inverted dumping position; a displaceable lid provided on said unit; an elevator on said frame for lifting loaded open topped boxes to bring these up successively under said lid so that said box is covered thereby while said unit is in starting position; means on said unit for gripping each such box when the latter is so related thereto whereby said box is lifted by said unit and inverted by the immediate subsequent oscillation of said unit to cause the contents of said box to be supported on said lid; and means for displacing said lid after said box has been thus inverted to accomplish the dumping of the contents from said box.

10. A combination as in claim 9 in which said lid embraces two doors hinged at their outer edges on said unit, the aforesaid means for displacing said lid causing said doors to swing downwardly about their hinge pivots.

11. In a box dumping machine, the combination of: a frame; a rocking head unit mounted on the frame; means for oscillating said unit between a starting position and an inverted dumping position; a lid including a pair of doors hingedly mounted on said unit at their outer edges; means for holding a loaded open topped box with the top thereof covered by said lid during the oscillation of said unit from a starting position to an inverted dumping position; means for holding said doors closed during said movement whereby the contents of said box are supported on said lid; and means for releasing said doors from said holding means to permit the doors to swing downwardly about their hinge pivots.

12. In a box dumping machine, the combination of: a frame; a rocking head unit mounted on the frame; means for oscillating said unit between a starting position and an inverted dumping position; a displaceable lid provided on said unit; an elevator on said frame for lifting loaded open topped boxes to bring these up successively under said lid so that said box is covered thereby while said unit is in starting position; means on said unit for gripping each such box when the latter is so related thereto whereby said box is lifted by said unit and inverted by the immediate subsequent oscillation of said unit to cause the contents of said box to be supported on said lid; means for displacing said lid after said box has been thus inverted to accomplish the dumping of the contents from said box; and means on said unit for ejecting the empty box therefrom.

13. In a box dumping machine, the combination of: a frame; a rocking head unit mounted on the frame; means for oscillating said unit between a starting position and an inverted dumping position; a displaceable lid provided on said unit; an elevator on said frame for lifting loaded open topped boxes to bring these up successively under said lid so that said box is covered thereby while said unit is in starting position; means on said unit for gripping each such box when the latter is so related thereto whereby said box is lifted by said unit and inverted by the immediate subsequent oscillation of said unit to cause the contents of said box to be supported on said lid; means for displacing said lid after said box has been thus inverted to accomplish the dumping of the contents from said box; and means for disengaging said gripping means from said box when the latter has been inverted.

14. In a box dumping machine, the combination of: a frame; a rocking head unit mounted on the frame; means for oscillating said unit between a starting position and an inverted dumping position; a displaceable lid provided on said unit; an elevator on said frame for lifting loaded open topped boxes to bring these up successively under said lid so that said box is covered thereby while said unit is in starting position; means on said unit for gripping each such box when the latter is so related thereto whereby said box is lifted by said unit and inverted by the immediate subsequent oscillation of said unit to cause the contents of said box to be supported on said lid; means for displacing said lid after said box has been thus inverted to accomplish the dumping of the contents from said box; means for disengaging said gripping means from said box when the latter has been inverted; and means on said unit for ejecting the empty box therefrom as said unit starts to return from inverted position to starting position.

15. In a box dumping machine, the combination of: a frame; a rocking head unit mounted on the frame; means for oscillating said unit between a starting position and an inverted dumping position; a displaceable lid provided on said unit; gripping means provided on said unit and disposed beneath said lid when said unit is in starting position, said gripping means being spaced to receive a box lifted upwardly therebetween adjacent the bottom of said lid with the open top of said box covered thereby, said gripping means then automatically engaging said box to support and lift the latter when said unit is oscillated from starting position to inverted position, the contents of said box thus becoming supported by said lid; an elevator on said frame for lifting loaded open topped boxes to bring these successively up under said lid as aforesaid when said unit is in starting position; and means for displacing said lid when said unit arrives in dumping position to accomplish the dumping of the contents from said box.

16. In a box dumping machine, the combination of: a frame; a rocking head unit mounted on the frame; means for oscillating said unit between a starting position and an inverted dumping position; a lid including a pair of doors hingedly mounted on said unit at their outer edges; means for holding a loaded open topped box with the top thereof covered by said lid during the oscillation of said unit from a starting position to an inverted dumping position; means for holding said doors closed during said movement whereby the contents of said box are supported on said lid; and means responsive to said unit arriving in said dumping position to cause said doors to open downwardly.

FOREST A. VAN VLECK.

REFERENCES CITED

The following references are of record in the file of this patent:

UNITED STATES PATENTS

| Number | Name | Date |
| --- | --- | --- |
| 1,474,857 | Stebler et al. | Nov. 20, 1923 |
| 1,906,126 | Mott | Apr. 25, 1933 |
| 2,018,748 | Thompson | Oct. 29, 1935 |
| 2,127,007 | Paxton | Aug. 16, 1938 |
| 2,254,550 | Stevenson | Sept. 2, 1941 |
| 2,258,461 | Marsden et al. | Oct. 7, 1941 |
| 2,421,365 | Patrick | May 27, 1947 |